United States Patent [19]

Weber et al.

[11] Patent Number: 6,051,661
[45] Date of Patent: Apr. 18, 2000

[54] THERMOPLASTIC MOLDING COMPOSITIONS

[75] Inventors: Martin Weber, Maikammer; Karin Elbl-Weiser, Schriesheim, both of Germany

[73] Assignee: BASF Aktiengesellschaft, Ludwigshafen, Germany

[21] Appl. No.: 09/012,028

[22] Filed: Jan. 22, 1998

[30] Foreign Application Priority Data

Jan. 24, 1997 [DE] Germany ............ 197 02 590

[51] Int. Cl.⁷ ............ C08G 65/48; C08F 238/00
[52] U.S. Cl. ............ 525/390; 525/392; 525/534; 525/535; 525/906
[58] Field of Search ............ 525/390, 392, 525/534, 535, 906

[56] References Cited

U.S. PATENT DOCUMENTS

| | | | |
|---|---|---|---|
| 3,709,841 | 1/1973 | Quentin ............ | 260/2.2 |
| 3,723,389 | 3/1973 | Khattab ............ | 260/49 |
| 4,642,358 | 2/1987 | Aycock et al. ............ | 549/295 |
| 4,870,153 | 9/1989 | Matzner et al. ............ | 528/125 |
| 4,879,338 | 11/1989 | Mercer et al. ............ | 524/508 |
| 4,999,415 | 3/1991 | Guiver et al. ............ | 528/171 |
| 5,066,719 | 11/1991 | Sivavec et al. ............ | 525/92 |
| 5,290,863 | 3/1994 | Brown et al. ............ | 525/92 |
| 5,457,169 | 10/1995 | Weber et al. ............ | 525/534 |
| 5,502,122 | 3/1996 | Weber et al. ............ | 525/534 |
| 5,527,844 | 6/1996 | Weber et al. ............ | 524/237 |
| 5,612,425 | 3/1997 | Weber et al. ............ | 525/534 |
| 5,631,333 | 5/1997 | Weber et al. ............ | 525/535 |
| 5,804,629 | 9/1998 | Weber et al. ............ | 524/424 |

FOREIGN PATENT DOCUMENTS

| | | |
|---|---|---|
| 113 112 | 12/1983 | European Pat. Off. . |
| 235885 | 9/1987 | European Pat. Off. . |
| 4114455 | 5/1991 | Germany . |
| 1152035 | 5/1969 | United Kingdom . |
| 96/41836 | 12/1996 | WIPO . |

OTHER PUBLICATIONS

Esser et al., *Polymer*, vol. 34, No. 13, 1993, pp. 2836–2844.
Koch et al., *Macromol. Chem. Phys.*, 195, pp. 1709–1717, 1994.
Warshawsky et al., *J. of Poly. Sci.*, vol. 28, pp. 2885–2905, 1990.
Johnson et al., *J. of Poly. Sci.*, vol. 22, pp. 721–737, 1984.
Myers, *ANTEC '92*, pp. 1420–1423.
Koch et al., *Macromolecules*, vol. 28, No. 14, Jul. 3, 1995, pp. 4806–4809.
Ritter et al. Oligo(Ester Sulfones). 1. Functionalized Oligo-(Ether–Sufones) From 4,4'–Bis–(4–Hydroxyphenyl)–Pentanoic Acid and Bis(4–Chlorophenyl)Sulfone: Synethesis, Properties, and Substitution fo the Chlorophenyl–Endgroups. Macromol. Rep., 1996, A33(Su.
Mader et al. The Interfacial Reaction of Modified Poly(arylether sulfone)s and Polyaramides. J. Appl. Polym Sci. (1997) 65,567–579.

*Primary Examiner*—James J. Seidleck
*Assistant Examiner*—Sanza McClendon
*Attorney, Agent, or Firm*—Keil & Weinkauf

[57] ABSTRACT

Thermoplastic molding compositions modified with carboxyl groups and comprising:
  A) at least one polyarylene ether and
  B) if desired, at least one filler or reinforcing material, wherein the molding composition also includes
  C) at least one modified polyarylene ether which contains carboxyl groups and has recurring structural elements of the formulae I and II

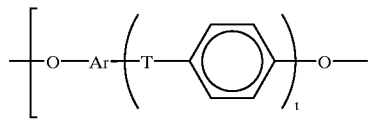

(I)

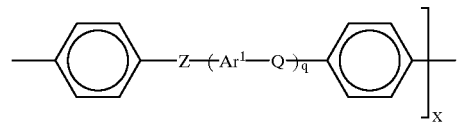

(II)

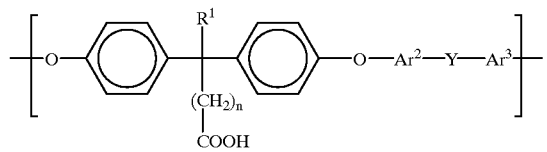

where Ar, Ar¹, Ar², Ar³, T, Z, Y, t, q, x and n are as variously defined, and
  R¹ is H, $C_1$–$C_6$-alkyl or —$(CH_2)_n$—COOH; and where the molar ratio of units of the formula I to units of the formula II is in the range from 0.05:99.95 to 99.95:0.05;
the use of these molding compositions for producing films, fibers and shaped articles, and the objects produced using the molding compositions, are described.

12 Claims, No Drawings

THERMOPLASTIC MOLDING COMPOSITIONS

DESCRIPTION

The invention relates to improved thermoplastic molding compositions which are rendered polar by modification with carboxyl groups, to the use of these molding compositions for producing films, fibers and shaped articles, and to the objects which are produced using the molding compositions.

Thermoplastic molding compositions based on polyarylene ethers are known from the prior art. Such molding compositions are distinguished by a number of interesting properties, such as good heat resistance, good mechanical strength and low water absorption. For various applications, it is desirable to modify polyarylene ether molding compositions of this type in a very specific way.

To produce moldings which have very pronounced resistance to mechanical wear, for example, the addition of reinforcing materials may be necessary. This raises the problem, however, that various mechanical properties of the moldings produced from them, such as impact strength, tensile strength, elongation at break and melt stability, may be affected disadvantageously. This disadvantageous effect is thought to result from inadequate compatibility of polyarylene ether component and reinforcing component.

Various polyarylene ether molding compositions containing modified polyarylene ether components are known from the prior art. For example, EP-A-0 185 237 describes thermoplastic molding compositions based on polyamide and polyarylene ether sulfone which have good mechanical properties, the polyarylene ether sulfone component having been modified by sulfonation with sulfur trioxide, by reaction with carboxylic anhydrides or by incorporation of sulfonic acid groups and/or carboxyl groups into the polymer chain. To introduce a carboxyl group, bis-4,4-(4-hydroxylphenyl) valeric acid, for example, can be incorporated into the polymer chain.

Although fibers and fillers are mentioned as further optional component, the worsening of mechanical properties which is associated with these and the possibilities for obviating this are not discussed.

Formulations with improved adhesion properties and containing a functionalized polyarylene ether component are known, for example, from DE 41 10 460. The functionalization is achieved, for example, by free-radical grafting onto the polyarylene ether chain of a reactive compound which includes, for example, besides a carbon-carbon double or triple bond, a number of carboxylic acid groups. A further disadvantage of this method is that the functionality of the product is controllable only to a limited extent. α,β-unsaturated dicarboxylic acids and their anhydrides and di- and monoesters are given as preferred examples of reactive compounds. Fiber-reinforced thermoplastic molding compositions and the problems associated with the incorporation of reinforcing agents are not described therein.

DE 41 14 455 describes polyarylene ethers modified in the same way as additional component for thermoplastic molding compositions based on polyamide and non-modified polyarylene ether. The molding compositions disclosed therein may also contain reinforcing materials. Problems which may be associated with the incorporation of fibrous fillers into these molding compositions are not discussed in that publication.

Modified polyarylene ethers which have anhydride end groups are also known from the prior art. For example, EP 613 916 describes the linking of the anhydride group to the polyarylene ether chain via an ester group.

Anhydride groups may also be linked to polyaryl ethers through the reaction of amino-terminated polyaryl ethers with an excess of dianhydride, as described by C. L. Myers, ANTEC '92, 1992, 1, 1420.

Anhydride groups may moreover also be attached to the polyarylene ether chain via an ether bridge, as described in PCT/EP 96/02990. Although the molding compositions prepared with, as adhesion promotors, polyarylene ethers modified with anhydride groups have good mechanical properties, the melt stability of the materials is unsatisfactory.

It is an object of the present invention to provide reinforced thermoplastic polyarylene ether molding compositions with improved mechanical properties.

Other applications of polyarylene ethers, in particular in the production of films and fibers, require an improvement in the wettability of the polyarylene ethers employed. A wide variety of experiments on the modification of polyarylene ethers is known, especially from the membrane materials sector. Thus U.S. Pat. No. 4,999,415 describes the metallation of polysulfone in solution. The subsequent reaction with electrophiles permits the incorporation of a very wide variety of functional groups, including carboxyl groups. Because of the complicated preparation method (inert gas, anhydrous solvents), these products have not become established.

The electrophilic substitution of polyarylene ethers has already been described using the example of sulfonation (B. C. Johnson et. al. J. Polym. Sci. A 22, 723–737 (1984), U.S. Pat. No. 3,709,841), bromination (U.S. Pat. No. 4,999,415, M. D. Guiver et. al. Preprints, Speciality Polymers 88) and halomethylation (A. Warshawsky et. al. J. Polym. Sci. A 28, 2885–2905 (1990)). However, these reactions only run under extreme conditions and are associated to some extent with degradation and crosslinking reactions; the removal of catalysts incurs considerable costs.

A further object of the present invention is to provide thermoplastic polyarylene ether molding compositions which have improved wettability and are moreover easier to prepare.

We have found that this object is achieved by providing molding compositions which include, in addition to a polyarylene ether component, a modified polyarylene ether with, in its polymer chain, units carrying carboxyl groups.

Surprisingly, it has been found in particular that when such modified polyarylene ethers are used as compatibility promoters it is possible to prepare thermoplastic molding compositions which have significantly improved mechanical properties, such as impact strength, tensile strength and elongation at break, and in addition have a distinctly improved melt stability.

It has also been established, surprisingly, that by using modified polyarylene ethers according to the invention the wettability of polyarylene ether molding compositions can be controlled not only more easily but also with considerably greater precision. Their preparation is moreover significantly improved in comparison with the prior art.

The present invention therefore firstly provides reinforced thermoplastic molding compositions comprising:

A) at least one polyarylene ether and

B) if desired, at least one filler or reinforcing material, wherein the molding composition also includes C) at least one modified polyarylene ether which contains carboxyl groups and has recurring structural elements of the formulae I and II

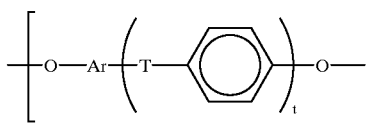

(I)

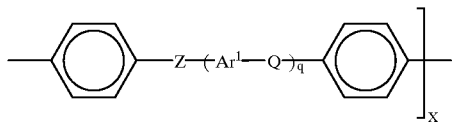

(II)

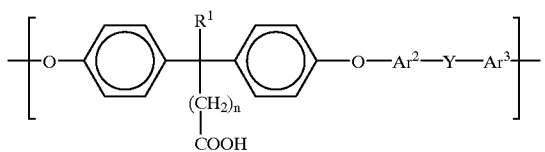

where x is 0.5 or 1, t and q, independently of one another, are 0, 1, 2 or 3, n is an integer from 0 to 6, Q, T, Y and Z, independently of one another, are respectively a chemical bond or a group selected from the class consisting of —O—, —S—, —SO$_2$—, S=O, C=O, —N=N—, —R$^a$C=CR$^b$— and —CR$^c$R$^d$—, where R$^a$ and R$^b$, independently of one another, are respectively hydrogen or C$_1$–C$_{12}$-alkyl and R$^c$ and R$^d$, independently of one another, are respectively hydrogen or C$_1$–C$_{12}$-alkyl, C$_1$–C$_{12}$-alkoxy or C$_6$–C$_{18}$-aryl, R$^c$ and R$^d$, independently of one another, being unsubstituted or substituted with fluorine and/or chlorine, or, if desired, together with the carbon atom to which they are bonded, form a C$_3$–C$_{12}$-cycloalkyl group, which is unsubstituted or substituted with one or more C$_1$–C$_6$-alkyl groups, with the proviso that at least one of the groups T, Q and Z is —SO$_2$— or C=O and, if t and q are 0, Z is —SO$_2$— or C=O, Ar, Ar$^1$, Ar$^2$ and Ar$^3$, independently of one another, are C$_6$–C$_{18}$-arylene, unsubstituted or substituted with C$_1$–C$_{12}$-alkyl, C$_6$–C$_{18}$-aryl, C$_1$–C$_{12}$-alkoxy or halogen, R$^1$ is H, C$_1$–C$_6$-alkyl or —(CH$_2$)$_n$—COOH; and where the molar ratio of units of the formula I to units of the formula II is in the range from 0.05:99.95 to 99.95:0.05.

Novel fiber-reinforced molding compositions comprise, as important constituents, at least one polyarylene ether A), at least one filler or reinforcing material B), at least one modified polyarylene ether C) as compatibility promoter for components A) and B) and, if desired, conventional additives D).

Novel molding compositions with improved wettability comprise, as important constituents, at least one polyarylene ether A), at least one modified polyarylene ether C) and, if desired, conventional additives D).

In a first preferred embodiment, fiber-reinforced molding compositions in accordance with the invention comprise, based on the total weight of the molding composition, a) from about 1 to about 98% by weight, preferably from about 5 to about 96.5% by weight, in particular from about 10 to about 93% by weight of non-modified polyarylene ether A), b) from about 1 to about 50% by weight, preferably from about 2 to about 45% by weight, in particular from about 5 to about 40% by weight, of reinforcing material B), c) from about 1 to about 98% by weight, preferably from about 1.5 to about 93% by weight, in particular from about 2 to about 85% by weight, of modified polyarylene ether C) and d) from 0 to about 30% by weight, preferably from 0 to about 25% by weight, in particular from 0 to about 20% by weight, of other conventional additives D).

In a second preferred embodiment, novel molding compositions with improved wettability comprise, based on the total weight of the molding composition:

a) from about 1 to about 99% by weight, preferably from about 5 to about 95% by weight, of polyarylene ether A), b) from about 1 to about 99% by weight, preferably from about 5 to about 95% by weight, of modified polyarylene ether C) and c) from 0 to about 50% by weight, preferably from 0 to about 35% by weight, of conventional additives D).

The following meanings apply in the functionalized or non-functionalized polyarylene ether components containing units of the formulae I and/or II and used according to the invention:

Alkyl radicals which may be used according to the invention include straight-chain or branched, saturated carbon chains having up to 12 carbon atoms, for example: C$_1$–C$_6$-alkyl, such as methyl, ethyl, n-propyl, isopropyl, n-butyl, sec-butyl or 2- or 3-methyl-pentyl; and longer-chained radicals, such as unbranched heptyl, octyl, nonyl, decyl, undecyl or lauryl and the singly or multiply branched analogs of these.

The alkyl moiety of alkoxy groups which can be used according to the invention is as defined above.

Cycloalkyl radicals which can be used according to the invention include in particular C$_3$–C$_{12}$-cycloalkyl, such as cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, -trimethyl and the like.

Examples of C$_6$–C$_{18}$-arylene groups which can be used according to the invention are phenylene, such as 1,2-, 1,3- and 1,4-phenylene, biphenylene groups, naphthylene groups, such as 1,6-, 1,7-, 2,6- and 2,7-naphthylene, and bridging groups derived from anthracene, phenanthrene and naphthacene.

Polyarylene ethers (Component A) which can be used according to the invention are built up from recurring units of the formula I

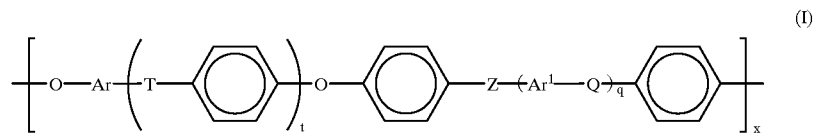
(I)

where Ar, $Ar^1$, T, Z, Q, t, q and x are as defined above. Different units of the formula I, distributed randomly or in blocks, may also be present in the polyarylene ether.

The polyarylene ethers A which can be used according to the invention may be prepared, for example, by the method described in GB 1 152 035 or U.S. Pat. No. 4,870,153, which are expressly incorporated herein by way of reference. Suitable process conditions for the synthesis of polyarylene ethers are described, for example, in EP-A-0 113 112 and EP-A-0 135 130. The reaction of the monomers in aprotic polar solvents in the presence of anhydrous alkali metal carbonate is particularly suitable. A particularly preferred combination is N-methylpyrrolidone as solvent and potassium carbonate as catalyst. Reaction in the melt is likewise preferred. Examples of suitable polyarylene ethers A are those having at least one of the following recurring structural units $I_1$ to $I_{29}$:

where x=0.5 in formula I:

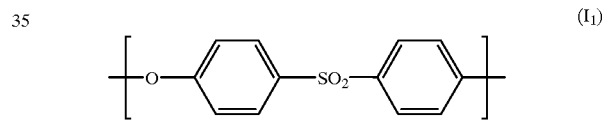
($I_1$)

where x=1 in formula I:

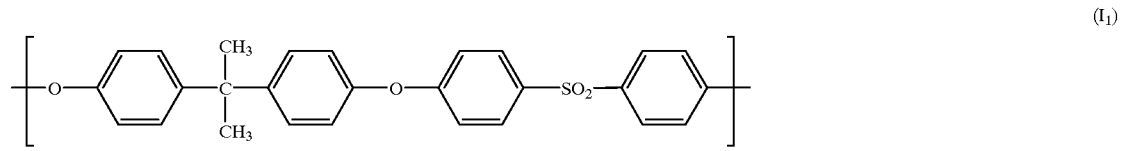
($I_1$)

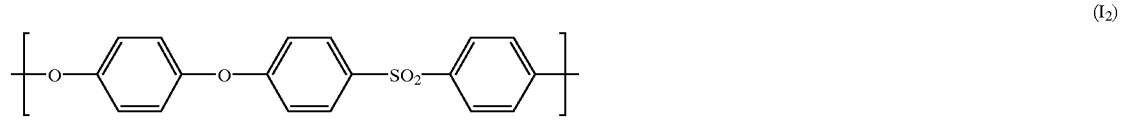
($I_2$)

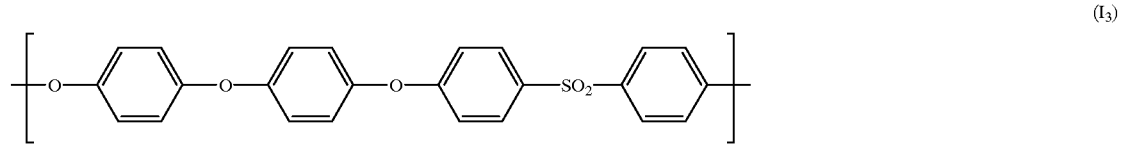
($I_3$)

($I_4$)

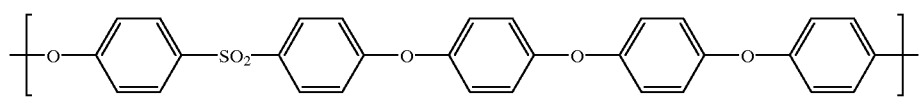
(I₅)
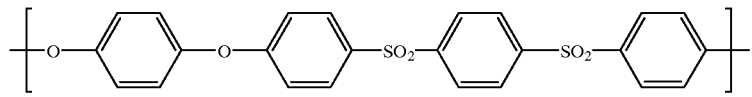
(I₆)
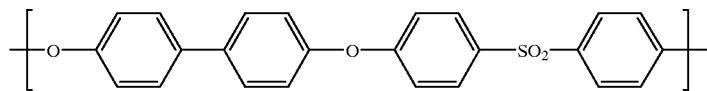
(I₇)
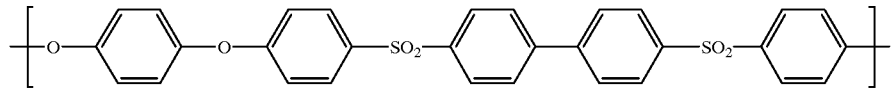
(I₈)
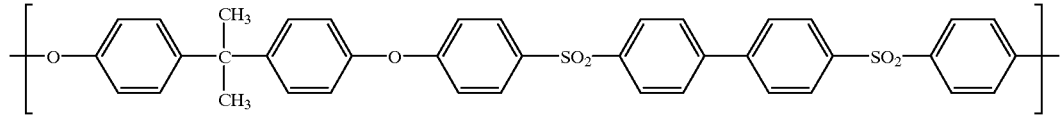
(I₉)
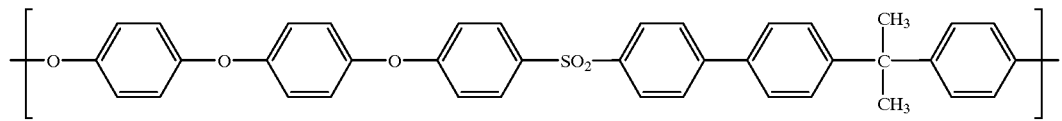
(I₁₀)
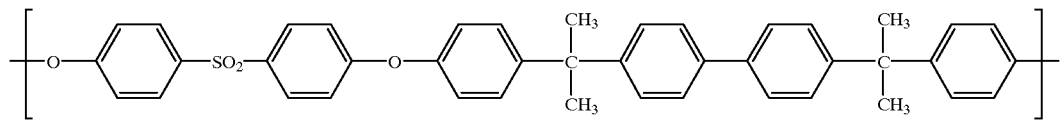
(I₁₁)
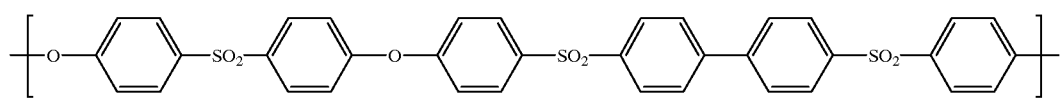
(I₁₂)
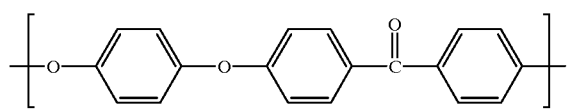
(I₁₃)
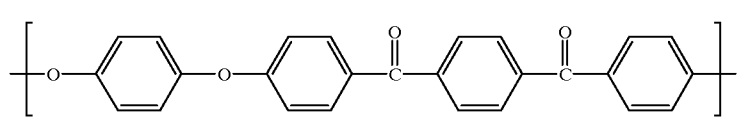
(I₁₄)
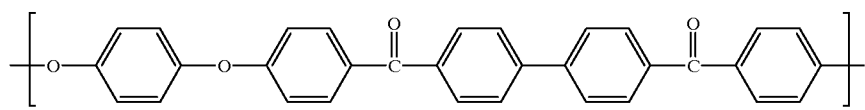
(I₁₅)
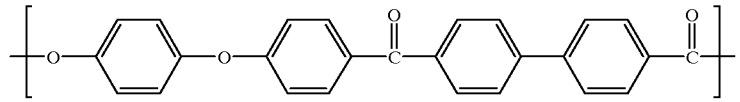
(I₁₆)

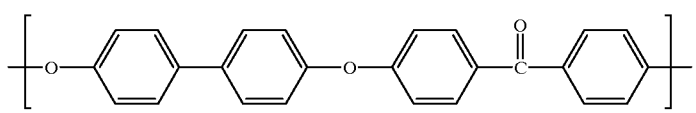
(I17)
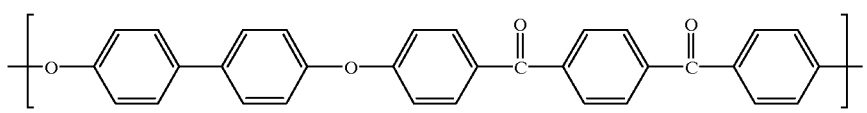
(I18)
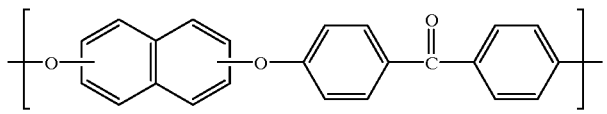
(I19)
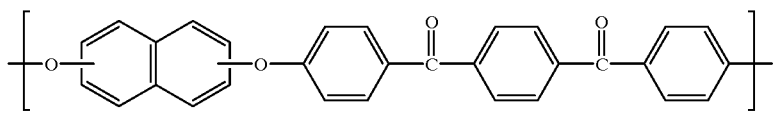
(I20)
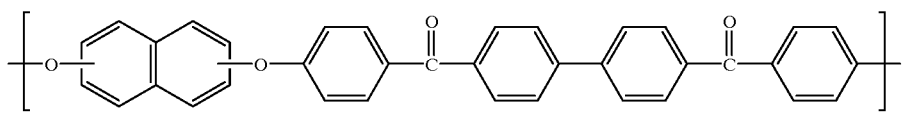
(I21)
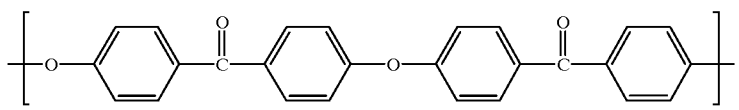
(I22)
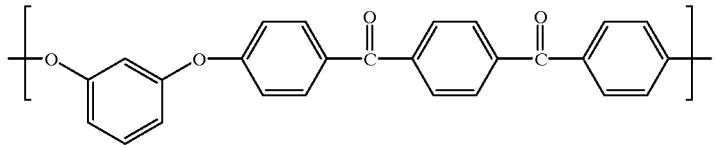
(I23)
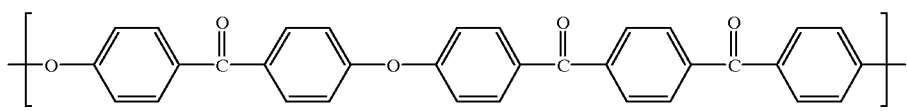
(I24)
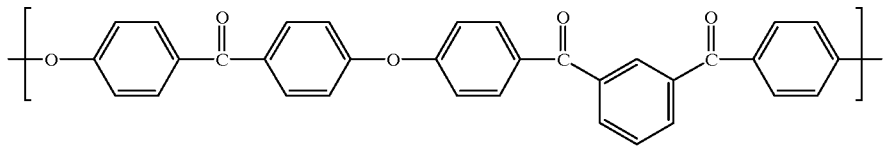
(I25)
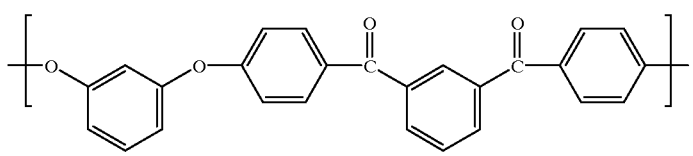
(I26)
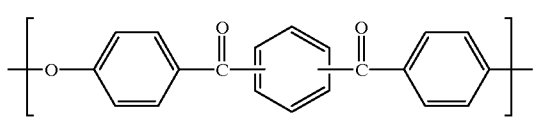
(I27)

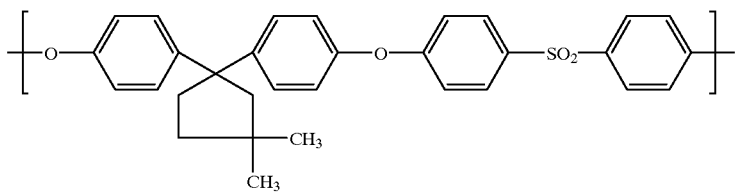

(I₂₈)

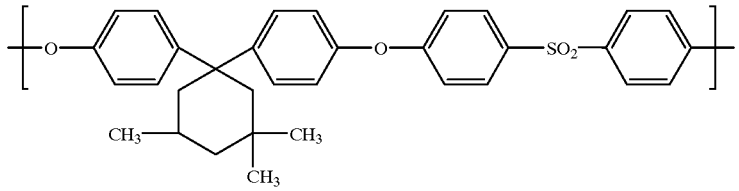

(I₂₉)

Particularly preferred units of the formula I are units of the formulae I₁ and I₂, which may be present individually or as a mixture.

The polyarylene ethers A can also be copolymers or block copolymers in which polyarylene ether segments and segments of other thermoplastic polymers, such as polyamides, polyesters, aromatic polycarbonates, polyester carbonates, polysiloxanes, polyimides or polyether imides are present. The molecular weights (number average) of the blocks or the graft branches in the copolymers are generally in the range from 1000 to 30,000 g/mol. The blocks of different structure can be arranged alternately or randomly. The proportion by weight of the polyarylene ethers in the copolymers or block copolymers is generally at least 10% by weight and can be up to 97% by weight. Copolymers or block copolymers with a proportion by weight of polyarylene ether of up to 90% by weight are preferred, and those with from 20 to 80% by weight of polyarylene ether are particularly preferred.

The polyarylene ethers generally have mean molecular weights $M_n$ (number-average) in the range from 5000 to 60,000 g/mol and relative viscosities of from 0.20 to 0.95 dl/g. The relative viscosities are measured, depending on the solubility of the polyarylene ethers, either in 1% strength by weight N-methylpyrrolidone solution, in mixtures of phenol and dichlorobenzene or in 96% strength sulfuric acid, in each case at 20° C. or 25° C.

The novel molding compositions contain, as component B, fibrous or particulate fillers or fibrous or particulate reinforcing materials.

Preferred fibrous fillers or fibrous reinforcing materials are carbon fibers, potassium titanate whiskers, aramid fibers and, particularly preferably, glass fibers. If glass fibers are used, they may be provided with a size and a coupling agent, for better compatibility with the matrix material. The carbon fibers and glass fibers which are used generally have a diameter in the range from 6 to 20 μm.

The glass fibers may be incorporated in the form of short glass fibers or in the form of rovings. In the finished injection molding, the mean length of the glass fibers is preferably in the range from 0.05 to 0.5 mm.

Carbon fibers or glass fibers may also be used in the form of fabrics, mats or glass fiber rovings.

Suitable particulate fillers are amorphous silica, magnesium carbonate (chalk), powdered quartz, mica, talc, feldspar, glass beads and in particular calcium silicates, such as wollastonite, and kaolin (in particular calcined kaolin).

Preferred combinations of fillers are, for example, 20% by weight of glass fibers with 15% by weight of wollastonite and 15% by weight of glass fibers with 15% by weight of wollastonite.

The polyarylene ethers (component C) which are used in the novel molding compositions as compatibility promoters and which have carboxylated side chains are compounds which are known per se or which can be prepared by known processes.

The modified polyarylene ethers according to the invention may be obtained, for example, by methods similar to those of EP-A-0 185 237 and by the methods described by I. W. Parsons et al., in Polymer, 34, 2836 (1993) and T. Koch, H. Ritter, in Macromol. Chem. Phys. 195, 1709 (1994).

The polyarylene ethers are thus obtainable, for example, by polycondensation of compounds of the formula III

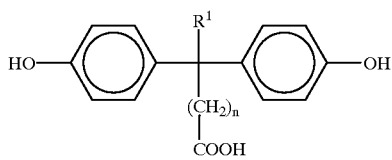

(III)

where $R^1$ and n are as defined above with at least one further, e.g. chlorofunctionalized aromatic compound, such as bis (4-chlorophenyl)sulfone, with further hydroxyfunctionalized compounds if desired, such as bisphenol A, and/or bisphenol S. Suitable reaction partners are well known to the person skilled in the art.

The methods used for polyarylene ethers A can also be employed, in principle, for preparing the modified polyarylene ethers C, preference being given to solution polymerization in dipolar aprotic solvents using the action of bases.

The explanations given above of preferred structural elements for polyarylene ethers A apply correspondingly to the modified polyarylene ethers C.

Examples of suitable structural elements II are:

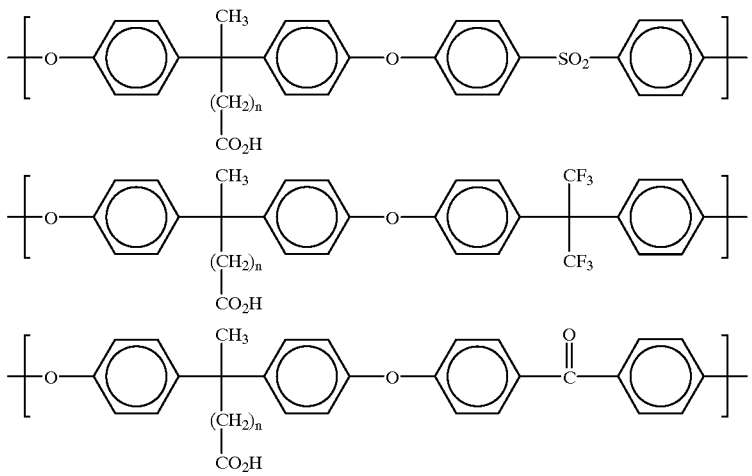

where each n is an integer from 0 to 4.

The polyarylene ethers C which contain acid groups and are used according to the invention have viscosity numbers of from about 15 to 80 ml/g (determined in 1% strength NMP solution at 25° C.). The proportion of free acid groups in component C is from 0.05 to 25 mol %, preferably from 0.1 to 20 mol %, and in particular from 0.1 to 15 mol %, the determination of the proportion of acid groups being by means of $^1$H-NMR, as described in I. W. Parsons et al., Polymer, 34 (1993), 2836.

As component D, the novel molding compositions may contain, for example, up to 40% by weight of other additives, such as flame retardants, dyes, pigments, stabilizers and lubricants.

The novel molding compositions can be prepared by methods known per se, for example by extrusion.

The thermoplastic molding compositions may, for example, be prepared by mixing the starting components in conventional mixing apparatus, such as screw extruders, preferably twin-screw extruders, Brabender mixers or Banbury mixers or compounders, followed by extrusion. The extrudate is usually cooled and comminuted following extrusion.

The sequence of mixing of the components may be varied, so that two or, if desired, three components may be premixed, but it is also possible to mix all of the components together.

In order to achieve a very homogeneous molding composition, intensive mixing is advantageous. For this, average mixing times of from 0.2 to 30 minutes at from 280 to 400° C., preferably from 290 to 390° C., are generally necessary.

The molding compositions containing filler have very good toughness and strength. In addition, they are distinguished by very good stability during processing and resistance to hydrolysis. They are therefore suitable, for example, for producing moldings which are exposed to high mechanical stresses or to the effects of chemicals.

The novel non-reinforced molding compositions may also be prepared and processed in the form of solutions. Examples of suitable solvents are dichloromethane, chloroform, chlorobenzene, ortho-dichlorobenzene, dimethylformamide, dimethylsulfoxide, dimethylacetamide, N-methylpyrrolidone, cyclohexanone and tetrahydrofuran. The solids content of suitable polymer solutions can vary across a wide range but is generally from about 1 to 80% by weight.

The invention will now be described using the following non-limiting examples.

EXAMPLES

In the following preparative examples, the viscosity number of the products was determined in 1% strength solution N-methylpyrrolidone at 25° C. The proportion of the units with acid groups was determined as in I. W. Parsons et al., Polymer 34 (1993), 2836, by $^1$H-NMR-spectroscopy.

Preparative Example 1
Carboxylated Polyarylene Ether $C_1$ 5.742 kg of dichlorodiphenyl sulfone, 4.374 kg of bisphenol A and 112 g of 4,4-bis(4-hydroxyphenyl)valeric acid were dissolved under nitrogen in 29 kg of N-methylpyrrolidone and mixed with 2.820 kg of anhydrous potassium carbonate.

The reaction mixture was firstly heated to 180° C. for 1 h at a pressure of 300 mbar, the water of reaction and N-methylpyrrolidone being continuously distilled off, and then reacted for 6 h at 190° C.

After adding 40 kg of N-methylpyrrolidone, the inorganic constituents were filtered off. Basic groups were neutralized by adding 50 ml of glacial acetic acid and the polymer was then isolated by precipitation in water. After 3 extractions with water, the product was dried under reduced pressure at 140° C., giving a white powder.

The proportion of units having acid groups was determined using $^1$H NMR as 1.2 mol % and the viscosity number of the product was 38.1 ml/g.

Preparation Example 2
Carboxylated Polyarylene Ether $C_2$ 5.742 kg of dichlorodiphenyl sulfone, 4.240 kg of bisphenol A and 280 g of 4,4-bis(4-hydroxyphenyl)valeric acid were dissolved, under nitrogen, in 29 kg of N-methylpyrrolidone and mixed with 2.820 kg of anhydrous potassium carbonate.

The reaction mixture was firstly heated at 180° C. for 1 h at a pressure of 300 mbar, the water of reaction and N-methylpyrrolidone being continuously distilled off, and then reacted for 6 h at 190° C.

After adding 40 kg of N-methylpyrrolidone, the inorganic constituents were filtered off. Basic groups were neutralized by adding 150 ml of glacial acetic acid and the polymer was then isolated by precipitation in water. After 3 extractions with water, the product was dried under reduced pressure at 140° C., giving a white powder.

The proportion of units having acid groups was determined using $^1$H NMR as 3.1 mol % and the viscosity number of the product was 37.1 ml/g.

Preparation Example 3
Carboxylated Polyarylene Ether $C_3$ 5.742 kg of dichlorodiphenyl sulfone, 5.076 kg of dihydroxydiphenyl sulfone and 305.8 g of bis-4,4-(4-hydroxyphenyl)valeric acid were dissolved, under nitrogen, in 29 kg of N-methylpyrrolidone and mixed with 2.820 kg of anhydrous potassium carbonate.

The reaction mixture was firstly heated at 180° C. for 1 h at a pressure of 300 mbar, the water of reaction and N-methylpyrrolidone being continuously distilled off, and then reacted for 6 h at 190° C.

After adding 40 kg of N-methylpyrrolidone, the inorganic constituents were filtered off. Basic groups were neutralized by adding 300 ml of glacial acetic acid and the polymer was then isolated by precipitation in water. After 3 extractions with water, the product was dried under reduced pressure at 140° C., giving a white powder.

The proportion of units having acid groups was determined using $^1$H NMR as 3.0 mol % and the viscosity number of the product was 40.2 ml/g.

Application Examples

Preparation and testing of the molding compositions a) Using the carboxylated polyarylene ethers $C_1$, $C_2$ and $C_3$ and the components $A_1$, $A_2$ and B listed below, novel fiber-reinforced molding compositions (1–5) were prepared and compared with conventional molding compositions (1c and 2c). The test results are shown in Table 1.

b) Using the carboxylated polyarylene ether $C_2$ and component $A_1$, novel non-reinforced molding compositions (6–9) were prepared and compared with conventional molding compositions (3c and 4c). The results are shown in Table 2.

Component $A_1$

The polyarylene ether $A_1$ was Ultrason S 2010 (commercial product of BASF AG). This product has a viscosity number of 56 ml/g, measured in 1% strength NMP solution at 25° C. It comprises predominantly units of the formula $I_2$.

Component $A_2$

The polyarylene ether $A_2$ was Ultrason E 1010 (commercial product of BASF AG). This product has a viscosity number of 49 ml/g, measured in 1% strength NMP solution at 25° C. It comprises predominantly units of the formula $I_1$.

Component B

E-glass fibers with a fiber diameter of 10 μm and a polyurethane size.

The thermoplastic molding compositions 1–5, 1c and 2c were compounded by melt extrusion on a ZSK 30 with a barrel temperature of 320° C. (polysulfone molding compositions) or 350° C. (polyether sulfone molding compositions), and converted at the same melt temperatures to give test specimens.

The tensile strength and elongation at break of the molding compositions 1–5, 1c and 2c were determined according to ISO 527 on tensile specimens. The impact strength of the products was measured on ISO specimens according to ISO 179 leu. To characterize the flowabilities of the products, the MVI values according to DIN 53 735 were determined at 320° C. and 21.6 kg load. The melt stability of the molding compositions was determined by measuring the MVI value of the melt after standing for 4 and 24 minutes respectively at 400° C. The numerical value given (in percent) is the change, based on the starting value, which occurs during this time. The formulations of the molding compositions and the results of the tests are listed in Table 1.

TABLE 1

| Molding Comp. No. | 1c | 1 | 2 | 3 | 2c | 4 | 5 |
|---|---|---|---|---|---|---|---|
| Component [% by wt.) | | | | | | | |
| $A_1$ | 70 | 65 | 60 | 60 | — | — | — |
| $A_2$ | — | — | — | — | 70 | 65 | 60 |
| B | 30 | 30 | 30 | 30 | 30 | 30 | 30 |
| $C_1$ | — | 5 | 10 | — | — | — | — |
| $C_2$ | — | — | — | 10 | — | — | — |
| $C_3$ | — | — | — | — | — | 5 | 10 |
| Impact strength [kJ/m$^2$] | 29.7 | 46.2 | 50.1 | 52.1 | 43 | 48 | 51.8 |
| Modulus of elasticity [N/mm$^2$] | 8600 | 8550 | 8400 | 8450 | 9350 | 9450 | 9500 |
| Tensile strength [N/mm$^2$] | 112 | 128 | 131 | 132 | 142 | 153 | 163 |
| Elongation at break [%] | 1.9 | 2.7 | 3.1 | 2.7 | 2.0 | 2.3 | 2.2 |
| MVI [ml/10'] | 32 | 37 | 41 | 43 | 37 | 34 | 33 |
| Melt stability [%] | 21 | 16 | 14 | 13 | 27 | 25 | 22 |

It is apparent from the experiments that the novel glass-fiber-reinforced molding compositions, surprisingly, have improved melt stabilities, as well as more favorable mechanical properties.

To determine wettability, 1 g of each molding composition 6–9, 3c and 4c was dissolved in dichloromethane and the solution was placed in a Teflon vessel. After the solvent had evaporated, the residual film was dried, in vacuo, firstly for 24 h at room temperature and then for 12 h at 130° C. To characterize the wettability, the contact angle was measured using water as medium. For this, a drop of water was applied to the surface of the film. After 10 seconds, the contact angle was determined according to the specification for the EN 828 Standard.

TABLE 2

| Film | 3c | 6 | 7 | 8 | 9 | 4c |
|---|---|---|---|---|---|---|
| Component [% by wt] | | | | | | |
| $A_1$ | 100 | 80 | 60 | 40 | 20 | — |
| $C_2$ | — | 20 | 40 | 60 | 80 | 100 |
| Contact angle[°] | 78.6 | 72.1 | 67.4 | 64.1 | 60.1 | 58.1 |

The results confirm that the novel mixtures have improved wettability with respect to water.

We claim:

1. A thermoplastic molding composition consisting essentially of:

A) at least one polyarylene ether and

B) optionally, at least one filler or reinforcing material, wherein the molding composition also includes C) at least one modified polyarylene ether which contains carboxyl groups and has recurring structural elements of the formulae I and II

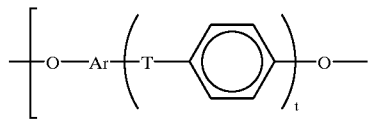
(I)

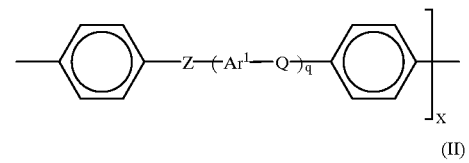
(II)

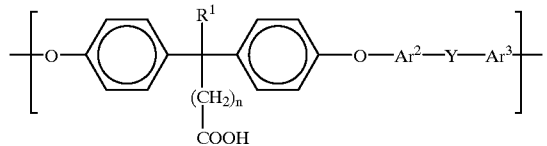

where x is 0.5 or 1, t and q, independently of one another, are 0, 1, 2 or 3, n is an integer from 0 to 6, Q, T, Y and Z, independently of one another, are respectively a chemical bond or a group selected from the class consisting of —O—, —S—, —$SO_2$—, S=O, C=O, —N=N—, —$R^a$C=$CR^b$— and —$CR^cR^d$—, where $R^a$ and $R^b$, independently of one another, are respectively hydrogen or $C_1$–$C_{12}$-alkyl and $R^c$ and $R^d$, independently of one another, are respectively hydrogen or $C_1$–$C_{12}$-alkyl, $C_1$–$C_{12}$-alkoxy or $C_6$–$C_{18}$-aryl, $R^c$ and $R^d$, independently of one another, being unsubstituted or substituted with fluorine and/or chlorine, or, if desired, together with the carbon atom to which they are bonded, form a $C_3$–$C_{12}$-cycloalkyl group, which is unsubstituted or substituted with one or more $C_1$–$C_6$-alkyl groups, with the proviso that at least one of the groups T, Q and Z is —$SO_2$— or C=O and, if t and q are 0, Z is —$SO_2$— or C=O, Ar, $Ar^1$, $Ar^2$ and $Ar^3$, independently of one another, are $C_6$–$C_{18}$-arylene, unsubstituted or substituted with $C_1$–$C_{12}$-alkyl, $C_6$–$C_{18}$-aryl, $C_1$–$C_{12}$-alkoxy or halogen, $R^1$ is H, $C_1$–$C_6$-alkyl or —$(CH_2)_n$—COOH; and having a proportion, determined by $^1$H-NMR, of units of the formula II containing free acid groups of from about 0.05 to 25 mol %.

2. A molding composition as claimed in claim 1, wherein the modified polyarylene ether C) includes structural elements of the formula II, where $Ar^2$ and $Ar^3$ are respectively 1,4-phenylene, Y is $SO_2$, $R^1$ is $C_1$–$C_6$-alkyl and n is an integer from 1 to 6.

3. A molding composition as claimed in claim 1, wherein the polyarylene ether A) is constructed of recurring structural elements of the above formula I, where Ar, $Ar^1$, T, Q, Z, t and q are as defined above.

4. A molding composition as claimed in claim 4, wherein the units of the formula I in components A) and C), independently of one another, are selected from the class consisting of units of the formulae $I_1$ and $I_2$

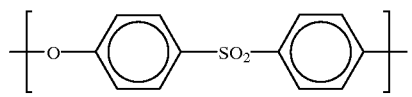
$I_1$

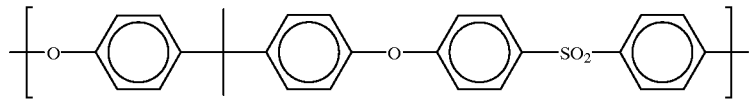
$I_2$ and mixtures of these.

5. A reinforced molding composition as claimed claim 1, which comprises, based on the total weight of the molding composition,
- a) from about 1 to about 98% by weight of at least one polyarylene ether A),
- b) from about 1 to about 50% by weight of at least one fibrous or particulate filler or reinforcing material B),
- c) from about 1 to about 98% by weight of at least one modified polyarylene ether C) and
- d) from 0 to about 30% by weight of at least one other conventional additive D).

6. A molding composition, as claimed in claim 1, with improved wettability given by polar substances and comprising, based on the total weight of the molding composition,
- a) from about 1 to about 99% by weight of at least one polyarylene ether A),
- b) from about 1 to about 99% by weight of at least one modified polyarylene ether C) and
- c) from 0 to about 50% by weight of at least one conventional additive D).

7. A solution of a molding composition as claimed in claim 1 comprising, in an organic solvent, from about 1 to about 80% by weight of components A), C) and, optionally, at least one conventional additive D).

8. A solution of a molding composition as claimed in claim 7 comprising, in an organic solvent, from about 1 to about 80% by weight of components A), C) and, optionally, D).

9. A fiber, a film and a shaped article, produced using a molding composition as claimed in claim 1.

10. A fiber, a film and a shaped article, produced using a molding composition as claimed in claim 7.

11. A fiber, a film and a shaped article, produced using a solution of a molding composition according to claim 8.

12. A molding composition as claimed in claim 1, containing up to 50% of at least one other conventional additive D).

* * * * *

UNITED STATES PATENT AND TRADEMARK OFFICE
CERTIFICATE OF CORRECTION

PATENT NO.: 6,051,661

DATED: April 18, 2000

INVENTOR(S): WEBER et al.

It is certified that error appears in the above-identified patent and that said Letters Patent is hereby corrected as shown below:

Col. 12, line 54 bridging line 55:

"bis
(4-chlorophenyl)sulfone"

should be together as --bis(4-chlorophenyl)sulfone--.

Col. 18, claim 4, line 48, "claim 4" should be --claim 3--.

Col. 20, claim 8, line 8, "claim 7" should be --claim 6--.

Col. 20, claim 10, line 14, "claim 7" should be --claim 6--.

Col. 20, claim 11, line 16, "claim 8" should be --claim 7--.

Signed and Sealed this

Ninth Day of January, 2001

Attest:

Q. TODD DICKINSON

Attesting Officer

Commissioner of Patents and Trademarks

UNITED STATES PATENT AND TRADEMARK OFFICE
CERTIFICATE OF CORRECTION

PATENT NO. : 6,051,661  
DATED : April 18, 2000  
INVENTOR(S) : Webber et al.

Page 1 of 3

It is certified that error appears in the above-identified patent and that said Letters Patent is hereby corrected as shown below:

Column 6 to 8,
Line 41, after "where x =1 in formula I:", the formulae printed on the patent are mis-identified and should be replaced with the following:

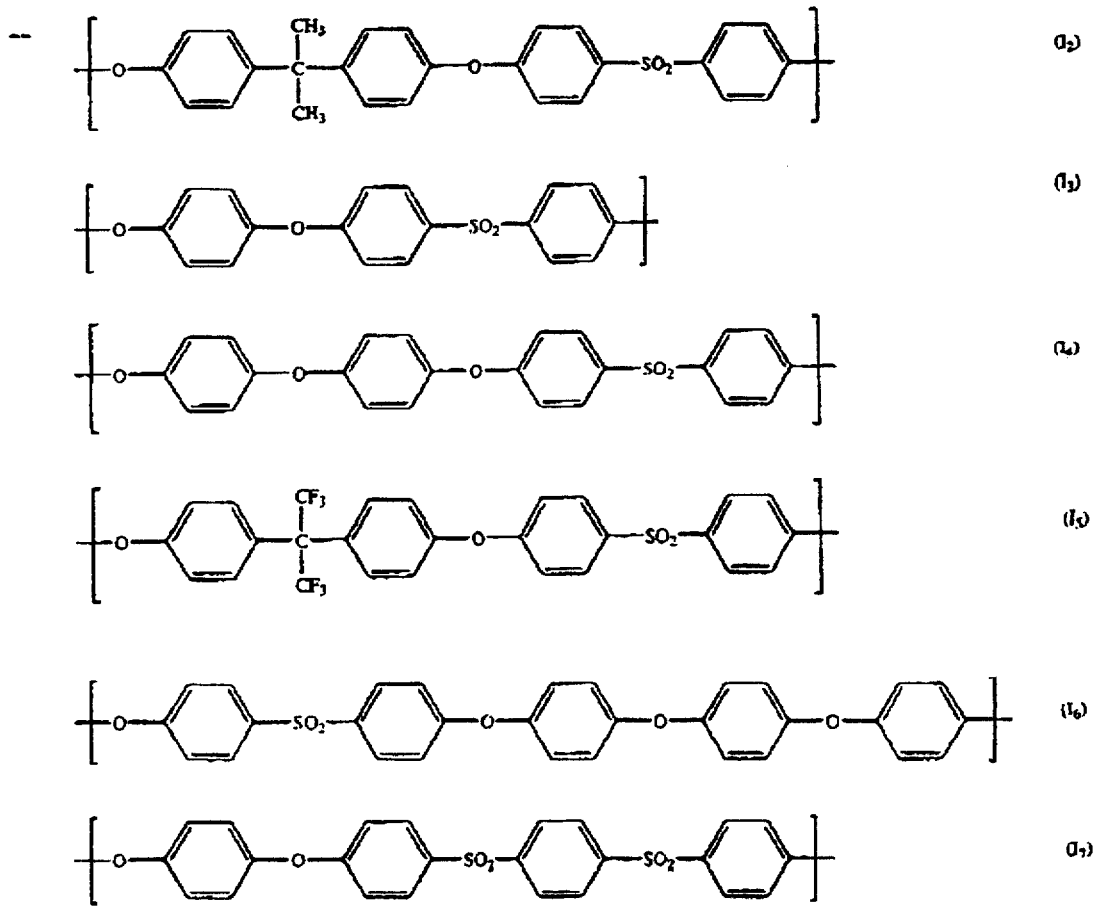

UNITED STATES PATENT AND TRADEMARK OFFICE
CERTIFICATE OF CORRECTION

PATENT NO. : 6,051,661
DATED : April 18, 2000
INVENTOR(S) : Webber et al.

Page 2 of 3

It is certified that error appears in the above-identified patent and that said Letters Patent is hereby corrected as shown below:

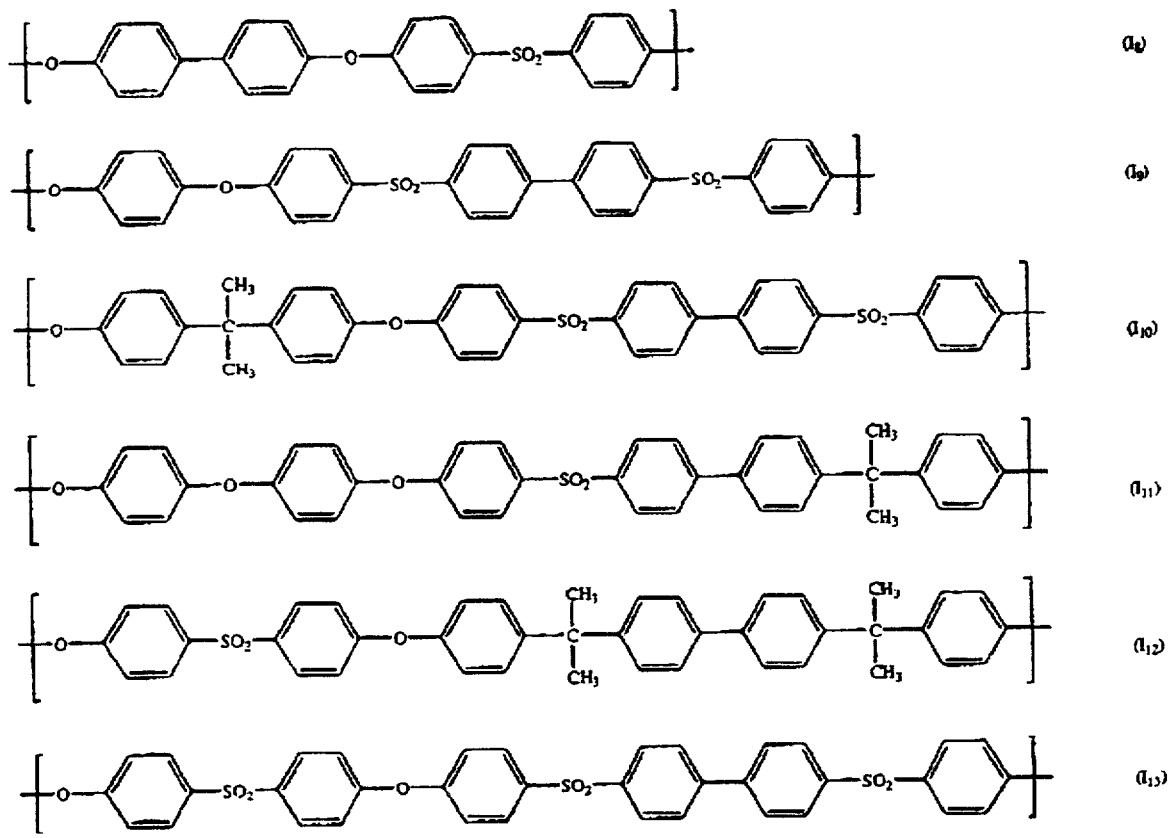

UNITED STATES PATENT AND TRADEMARK OFFICE
CERTIFICATE OF CORRECTION

PATENT NO. : 6,051,661
DATED : April 18, 2000
INVENTOR(S) : Webber et al.

Page 3 of 3

It is certified that error appears in the above-identified patent and that said Letters Patent is hereby corrected as shown below:

Column 7 and 8,
Delete the last formula on the page.

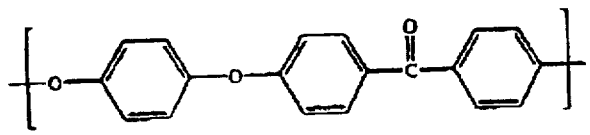

$(I_{14})$

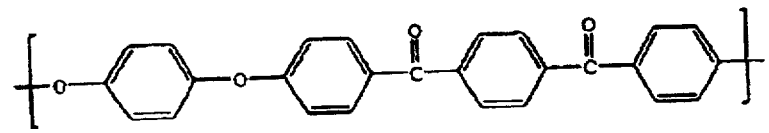

$(I_{15})$

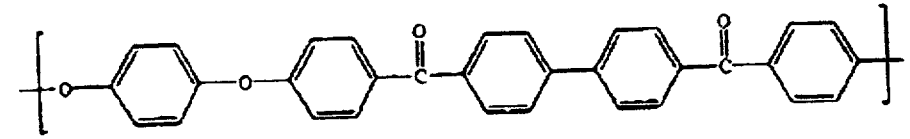

$(I_{16})$

Signed and Sealed this

Twenty-first Day of August, 2001

*Attest:*

*Attesting Officer*

NICHOLAS P. GODICI
*Acting Director of the United States Patent and Trademark Office*